United States Patent [19]

James

[11] 3,881,829
[45] May 6, 1975

[54] CONNECTIONS BETWEEN STRUCTURAL COMPONENTS

[75] Inventor: John Brian James, Wembley, England

[73] Assignee: Dexion-Comino International Limited, Wembley, Middlesex, England

[22] Filed: Nov. 27, 1973

[21] Appl. No.: 419,470

[30] Foreign Application Priority Data
Nov. 27, 1972  United Kingdom............... 54723/72

[52] U.S. Cl. ..................... 403/27; 52/760; 108/109; 211/177; 403/2; 403/254
[51] Int. Cl. ............................................. A47f 5/10
[58] Field of Search ......... 403/27, 2, 190, 230, 252, 403/254; 52/98, 99, 100, 760; 285/2, 3, 4; 211/148, 176, 177; 108/109; 116/114 AC, 114 AH, DIG. 34, 114 R; 85/61, 62

[56] References Cited
UNITED STATES PATENTS
3,047,108  7/1962  D'Altrui................................ 403/20
3,273,720  9/1966  Seiz.................................... 248/243
3,456,970  7/1969  Sunasky............................. 211/148
3,612,290  10/1971  Evans................................. 211/148

*Primary Examiner*—Werner H. Schroeder
*Assistant Examiner*—Conrad L. Berman
*Attorney, Agent, or Firm*—Pollock, Philpitt & Vande Sande

[57] ABSTRACT

The invention concerns locking means for a connection between structural components in which a projecting part for effecting locking by engaging through holes in connected components is adapted for fracturing under a predetermined loading in two stages or at two locations and in such a manner as too indicate visibly that failure of the locking means has occurred. Advantageously the locking part is of a U-shape and arranged to fracture near the roots of the limbs of that shape. The failure indication may be given by a plate or disc arranged so that it will fall away in the event of fracture of the locking part.

5 Claims, 3 Drawing Figures

PATENTED MAY 6 1975 3,881,829
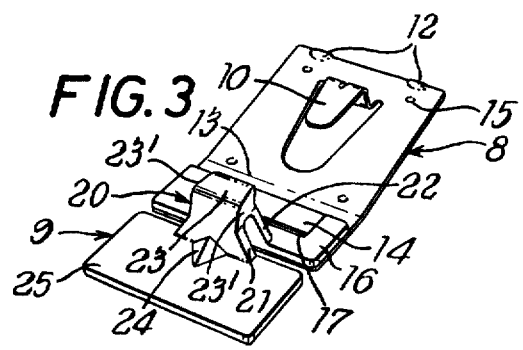
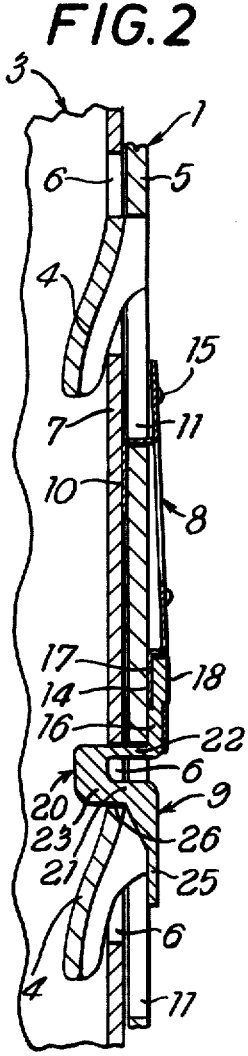
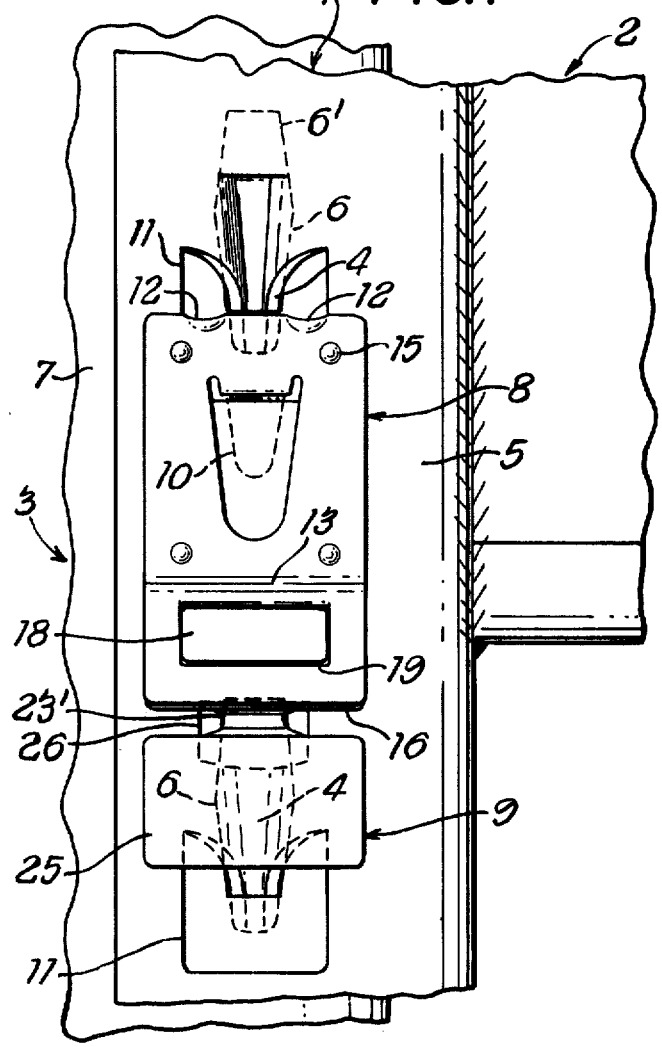

CONNECTIONS BETWEEN STRUCTURAL COMPONENTS

This invention concerns improvements relating to connections between structural components, especially between metal upright and beam components of racking and like frame structures. It seeks, in particular, to provide improved locking means for securing such connections against unintentional release. The improved locking means are particularly intended for use in racking in which the basic components, namely uprights and beams, are held together by means of hooks provided on the one component and engageable in holes provided in the other component. The invention is especially, although not exclusively, concerned with improvements upon locking means such as are described and claimed in the Specification of U.S. Pat. No. 3,456,970.

It is a disadvantage of known locking means of this kind that a lifting force or shock accidentally applied to a beam component may result in damage to the structure or, if not in itself necessarily a source of danger, may cause the locking means to fail in unpredictable and undetected manner such that danger or difficulty can thereafter arise. The present invention seeks to avoid these drawbacks.

According to the invention, in locking means for a connection between structural components, a projecting part thereof for effecting locking by engaging through holes in connected components is adapted for fracturing under a predetermined loading in two stages or at two locations and in such a manner as to indicate visibly that failure of the locking means has occurred. Preferably, the said locking part is of a U-shape and arranged to fracture near the roots of the limbs of that shape. The locking part should be made of a material which will fracture rather than bend under loading. The locking means may be arranged so that the forces tending to produce fracture act on the locking part in slightly offset positions along its length or in coincident positions.

For providing the failure indication, the locking means may comprise a visible element, for example a small plate or disc, arranged so that it will reliably fall away in the event of fracture of the said part. Advantageously this falling away may be revealed by a colour difference or the absence of a colour difference apparent only when the element is missing.

The locking part together with the indicating element is preferably made as a unit attachable to the rest of the locking means.

One manner of carrying the invention into effect will now be more fully described by way of example and with reference to the accompanying drawing, in which:

FIG. 1 is a front elevation of a locking device applied to a connection,

FIG. 2 a vertical section through the connection, and

FIG. 3 a perspective view of the locking device alone.

The example illustrates one manner of applying the invention to the case of racking components connected by hook members in the manner described in the aforesaid Specification. Thus the connection is between an angle-section bracket 1 fixed to one end of a beam component 2, for example of box section, and an upright component 3, for example of channel section, of a racking structure. The beam component is similarly connected to a second upright at its other end (not shown). The actual connection is established by two (as shown) or more hooks 4 which are formed integrally with the front flange 5 of the bracket 1 and are engaged in selected holes 6 of truncated diamond shape provided at vertical intervals in the front wall 7 of the upright component 3. The connection is locked by the device now to be described.

The locking device consists of two portions, an upper supporting and locating part 8 made of spring steel and a locking portion 9 die cast as a unit from a zinc-base or aluminium alloy which is not very ductile but will fracture reliably, i.e. by cracking sharply, under predetermined upward loading, as hereinafter described. The part 8, suitably a strip or plate of vertically elongated rectangular shape, has an upper rearwardly stamped-out, downwardly directed, tongue 10 by which it is attached to the beam by engagement through a hole 11 in the flange 5, as shown in FIG. 2. With this mode of attachment, it is possible not only to retract the locking portion 9 away from the wall 7 by elastic flexing of the part 8, but also to rock the device transversely of the flange 5 to an inoperative position, as described in the aforesaid Specification. Centering dimples 12 engageable with the side edges of the hole 11 are provided at the upper edge of the part 8. In an unstressed condition, the part 8 is slightly bent rearwardly at a transverse line 13 (FIG. 3) below the tongue 10, so that its lower portion has an initial flexure towards the flange 5 and resiliently loads the locking portion 9 rearwardly. Below the line 13, the part 8 has a second rearwardly stamped-out, downwardly directed, substantially rectangular tongue 14, wider than the tongue 10, for holding the portion 9. As shown, the strip part 8 is also formed with four dimples 15.

The locking portion 9 comprises an upper vertical part in the form of a flat plate 16 to be held, firmly but releasably, by the tongue 14. To this end, the plate 16 has a substantially rectangular recess 17 in its rear face, in which the tongue 14 engages, and a raised substantially rectangular region 18 on its front face which engages in the hole 19 (FIG. 1) in the part 8, left by the stamping out of the tongue 14. Advantageously the tongue 14, the recess 17 and raised region 18 are all slightly tapered downwardly to facilitate engagement. If desired, the edges of the recess 17 may be chamfered. Below the lower edge of the part 8, the locking portion 9 has an integral, rearwardly projecting, locking formation 20 of a U-shape as seen from the side (FIG. 2). The formation 20, as shown, has parallel top and bottom surfaces. However, it may taper slightly towards the rear. The vertical dimension of the formation 20 is such that it will engage snugly, through a hole 26 in the flange 5, into a lower hole 6 in the front wall 7 of the upright and immediately above the top of a hook 4 engaged in the same hole 6. As seen from the side (FIG. 2) the lower limb 21 of the U-shaped formation 20 is thicker than the upper limb 22 and its base 23 is thicker than either limb. The side faces 23' (FIGS. 1 and 3) of the base 23 taper upwardly to conform with the shape of the uppermost portion (marked at 6' for the upper hole 6 in FIG. 1 which appears more clearly than the lower hole 6) of the hole 6 in which it engages. As is apparent from FIG. 3, the width of the formation 29 is substantially less than that of the plate 16 to which it is integrally connected by the limb 22 which flares (FIG. 3) towards the said plate. Below the lower limb 21 is a prismatic projection 24 shaped to engage within the hollow interior of the hook 4 in the locking position of the device. The limb 21, which flares like the upper limb, is integral with a lower rectangular plate 25 which extends downwardly so that it lies against the front face of the flange 5 in the locking position of the device (FIG. 2).

The normal use and functioning of the locking device are as described in the aforesaid Specification. Thus on full engagement of the hooks 4 in the holes 6, the locking formation 20 engages automatically in the gap between the upper edge of the lower hole 6 and the upper margin of the hook 4 (FIG. 2) and prevents disengagement of that hook, and therefore of the whole beam 2, from the upright 3. To release the locking action, it is only necessary to retract the locking device so that the formation 20 is withdrawn from the hole 6 and then to rock it sideways so that the base 23 thereof rests on the front face of the part 7 beside the said hole ready for future automatic re-engagement. On re-engagement, one tapered side of the limb 21 centers the locking device by contact with one side edge of the hole 26.

In the event of an accidental lifting force coming to act on the beam component while the locking device is engaged, however, the effect will be as follows:

The top of the lower hook 4 will be forced up against the lower limb 21 of the locking formation 20 and the upper limb 22 against the upper edge of the hole 6, usually causing the said formation to tilt upwardly at the rear and tending to fracture the upper limb 22 where it engages the upper edge of the hole 6. If a predetermined upward force is exceeded, first one limb, generally the upper limb 22 and, immediately, the other limb 21 will be fractured near the root with a sharp crack. Generally the base part 20 will fall away rearwardly, but the front plate 25 will certainly fall away forwardly. In any event, the local locking action ceases, so that risk of the upward force causing serious damage to the racking structure itself is at least greatly reduced. The indication that the locking device has failed, afforded by the falling away of the plate 25, may be made more conspicuous by a colour difference or the absence of a colour difference. Thus the area of the front surface of the flange 5 normally covered by the plate 25 may be of a bright colour contrasting with that of the adjacent parts. Preferably, however, the plate 25 is itself made of a bright contrasting colour, so that its absence is conspicuous. Alternatively, the colour contrast may be provided by a thin plastics disc suspended so that it is normally covered by the plate.

I claim:

1. Locking means for interconnecting structural members comprising in combination:
    means on a first of said members detachably engaging a recess in another of said members for supporting a load acting between said members in a predetermined direction,
    a U-shaped projecting member formed of a frangible material on one of said members and detachably engaging with a cooperating means on the other of said members,
    said cooperating means exerting a force against the legs of said U-shaped member acting in a direction tending to bend at least one leg portion thereof against the other, whereby at least one leg portion of said U-shaped member fractures.

2. The locking means of claim 1 wherein said leg portion which fractures falls away, and means providing a visible indication that said fractured leg portion has fallen away.

3. Locking means according to claim 1 and further comprising a supporting and locating part attachable to one of the structural components for loading said locked part, supported by it, towards the locking position.

4. Locking means according to claim 1 and further comprising a supporting and locating part attachable to one of the structural components and adapted for loading the said projecting member, while supported by it, towards the locking position, said projecting member being connected detachably to said supporting part.

5. Locking means according to claim 1, said projecting member including first and second limbs and being attached to said supporting part by an upstanding plate connected to said first upper limb of said U-shaped projecting member and interengaged detachably with the supporting part, a failure-indicating element being connected to said second lower limb of said U-shaped projecting member.

* * * * *